United States Patent
Koechley et al.

(10) Patent No.: US 7,640,498 B2
(45) Date of Patent: Dec. 29, 2009

(54) METHOD AND SYSTEM FOR MAINTAINING FONT SIZES ON DIFFERENT PLATFORMS

(75) Inventors: Nathaniel E. Koechley, San Francisco, CA (US); Sean M. Imler, San Jose, CA (US); Matthew J. Sweeney, Palo Alto, CA (US)

(73) Assignee: Yahoo! Inc., Sunnyvale, CA (US)

(*) Notice: Subject to any disclaimer, the term of this patent is extended or adjusted under 35 U.S.C. 154(b) by 68 days.

(21) Appl. No.: 10/888,345

(22) Filed: Jul. 9, 2004

(65) Prior Publication Data

US 2005/0086599 A1 Apr. 21, 2005

Related U.S. Application Data

(60) Provisional application No. 60/486,698, filed on Jul. 11, 2003.

(51) Int. Cl.
G06F 17/00 (2006.01)
(52) U.S. Cl. .................. 715/255; 715/243; 715/256; 715/269
(58) Field of Classification Search ............ 715/542, 715/517, 530, 243, 255, 269
See application file for complete search history.

(56) References Cited

U.S. PATENT DOCUMENTS

| | | | | |
|---|---|---|---|---|
| 5,533,174 A | * | 7/1996 | Flowers et al. | 358/1.15 |
| 5,598,520 A | * | 1/1997 | Harel et al. | 345/469 |
| 5,805,153 A | * | 9/1998 | Nielsen | 725/37 |
| 5,815,160 A | * | 9/1998 | Kikuchi et al. | 345/661 |
| 5,920,880 A | * | 7/1999 | Dowdy et al. | 715/205 |
| 6,073,147 A | * | 6/2000 | Chan et al. | 715/234 |
| 6,167,441 A | * | 12/2000 | Himmel | 709/217 |
| 6,356,268 B1 | * | 3/2002 | Beaman et al. | 345/467 |
| 6,519,630 B1 | * | 2/2003 | Hanawa | 709/206 |
| 6,665,842 B2 | * | 12/2003 | Nielsen | 715/542 |
| 6,700,589 B1 | * | 3/2004 | Canelones et al. | 345/660 |
| 7,210,099 B2 | * | 4/2007 | Rohrabaugh et al. | 715/249 |
| 7,222,306 B2 | * | 5/2007 | Kaasila et al. | 715/801 |
| 7,287,220 B2 | * | 10/2007 | Kaasila et al. | 715/201 |
| 7,385,606 B2 | * | 6/2008 | Everett et al. | 345/467 |

(Continued)

OTHER PUBLICATIONS

Good, Lance, et al. "Automatic Text Reduction for Changing Size Constraints", CHI 2002, Apr. 20-25, 2002.*

*Primary Examiner*—Rachna S Desai
(74) *Attorney, Agent, or Firm*—Darby & Darby PC; John W. Branch

(57) ABSTRACT

The invention is directed to a system and method for automatically enabling the font size for text in a web page to be maintained as intended across different types of platforms and without disabling the native controls for adjusting font sizes. If a web page that employs the invention is selected for display, the type of platform, i.e., particular operating system and browser application, for displaying the web page is automatically determined. Once the platform is determined, the invention automatically provides the platform with predetermined small, big, and default font sizes that enable the display of the text at the same size(s) as intended for the web page. Research is performed for the different types of platforms to predetermine font sizes for small, big and default text that will enable the display of text as intended by the author of the web page at a similar size on each platform.

40 Claims, 10 Drawing Sheets

U.S. PATENT DOCUMENTS

| | | | |
|---|---|---|---|
| 7,386,790 B2 * | 6/2008 | Hino | 715/269 |
| 7,461,353 B2 * | 12/2008 | Rohrbaugh et al. | 715/815 |
| 7,502,867 B2 * | 3/2009 | Mitchell et al. | 709/246 |
| 7,555,706 B2 * | 6/2009 | Chapman et al. | 715/234 |
| 7,565,359 B2 * | 7/2009 | Nazem et al. | 707/10 |
| 2004/0177323 A1 * | 9/2004 | Kaasila et al. | 715/513 |
| 2004/0183817 A1 * | 9/2004 | Kaasila | 345/660 |
| 2005/0131887 A1 * | 6/2005 | Rohrbaugh et al. | 707/3 |
| 2007/0216687 A1 * | 9/2007 | Kaasila et al. | 345/441 |

* cited by examiner

```
<script type="text/javascript" src="http://us.js1.yimg.com/us.yimg.com/lib/
common/yg_csstare.js"></script>
```

```
<!-- ygagt=navigator.userAgent.toLowerCase();ygd=document;ygdom=(document.getEle
entById)?1:0;ygns=(ygd.layers)?1:0;ygns6=(ygdom&&navigator.appName=="Netscap
e");ygie=(ygd.all);ygwin=((ygagt.indexOf("win")!=-1)||(ygagt.indexOf("16bit"
)!=-1));ygmac=(ygagt.indexOf("mac")!=-1);ygnix=((ygagt.indexOf("x11")!=-1)||
(ygagt.indexOf("linux")!=-1));
var ygar = new Array();
ygar[0]="<style type=\"text/css\">\n<!--\n";
if (ygns && ygwin){ ygar[1]=".ygbody,th,td,.ygbt,big{font-
family:arial,helvetica,sans-serif;font
-size:small;}body{background-color:white;}";
ygar[2]=".ygta,input{font-family:monospace;font-size:small;}";
ygar[3]="small{font-family:verdana,arial,sans-serif;font-size:x-small;}";
ygar[4]="big{font-size:medium;}";}
else if (ygns && ygmac){
ygar[1]=".ygbody,body,th,td,big{font-family:arial,helvetica,sans-serif;font-
size:medium;}body{background-color:white;}";
ygar[2]="small{font-family:verdana,arial,sans-serif;font-size:small;}";
ygar[3]="big{font-size:big;}";}
else if (ygns && ygnix){ ygar[1]=".ygbody,body,th,td,.ygbt,big{font-
family:helvetica,clean,sans-serif
;font-size:medium;}body{background-color:white;}";
ygar[2]=".ygta,input,select{line-height:7px;font-family:monospace;font-size:
small;}"; ygar[3]="small{line-height:10px;font-
family:helvetica,clean,terminal,sans-se
rif;font-size:small;}";
ygar[4]="big{font-size:110%;}";}
else if (ygns6||(ygie && ygmac)){ ygar[1]=".ygbody,body,table,big {font-
family:arial,helvetica,sans-serif;font-size:12px;}body{background-colo
r:white;}"; ygar[2]="tr,th,td{font-size:12px;line-height:16px;}";
ygar[3]="small,small b,small a{font-family:verdana,arial,sans-serif;font-
size:10px;line-height:14px;}";
ygar[4]="big,big b,big a{font-size:16px;line-height:20px;}";}
// percentages: IE PC
else{ ygar[1]="body,th,td,big{font-family:arial,helvetica,sans-serif;font-
size:79%
;}body{background-color:white;}"; ygar[2]="td{line-height:1.25em;}";
ygar[3]="small{font-family:verdana,arial,sans-serif;font-size:81%;line-heigh
t:1.25em;}"; ygar[4]="big{font-size:125%;line-height:1.15em;}";}
var ygarjoin = ygar.join('');
ygd.write (ygarjoin);
ygd.write(".ygcw{color:white;}.ygcb{color:black;}.ygfa{font-family:arial,san
s-serif;}.ygfv{font-family:verdana,arial,sans-serif;}.ygft{font-family:times
,serif;}.ygtb{font-size:18px;}.ygtbw{font-size:18px;color:white;}\n-->\n<\/s
tyle>");
// -->
```

*FIG. 10*

METHOD AND SYSTEM FOR MAINTAINING FONT SIZES ON DIFFERENT PLATFORMS

CROSS REFERENCE TO RELATED APPLICATIONS

This application claims the benefit of U.S. Provisional Application Ser. No. 60/486,698 filed on Jul. 11, 2003, the benefit of the earlier filing date of which is hereby claimed under 35 U.S.C. § 119 (e) and further incorporated by reference.

FIELD OF THE INVENTION

The present invention is generally directed to displaying text in a web page, and more particularly, to enabling the same relative font size to be displayed on different platforms as intended by the author of the web page.

BACKGROUND OF THE INVENTION

An author of content in a web page initially selects the type and size of the font for displayed text. However, the functional differences in the operation of different types of platforms, (operating system and browser) make it difficult to display text in the intended font size across different platforms. In the past, different approaches have been employed to try to maintain consistent font sizes for the display of text in a web page on different platforms. However, these approaches can interfere with the operation of a browser control for adjusting font size and may not work in the same way on different types of platforms.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 10 shows an exemplary JavaScript for automatically providing the predetermined font sizes based on the type of platform, in accordance with the present invention.

DETAILED DESCRIPTION OF THE INVENTION

Figure 1:
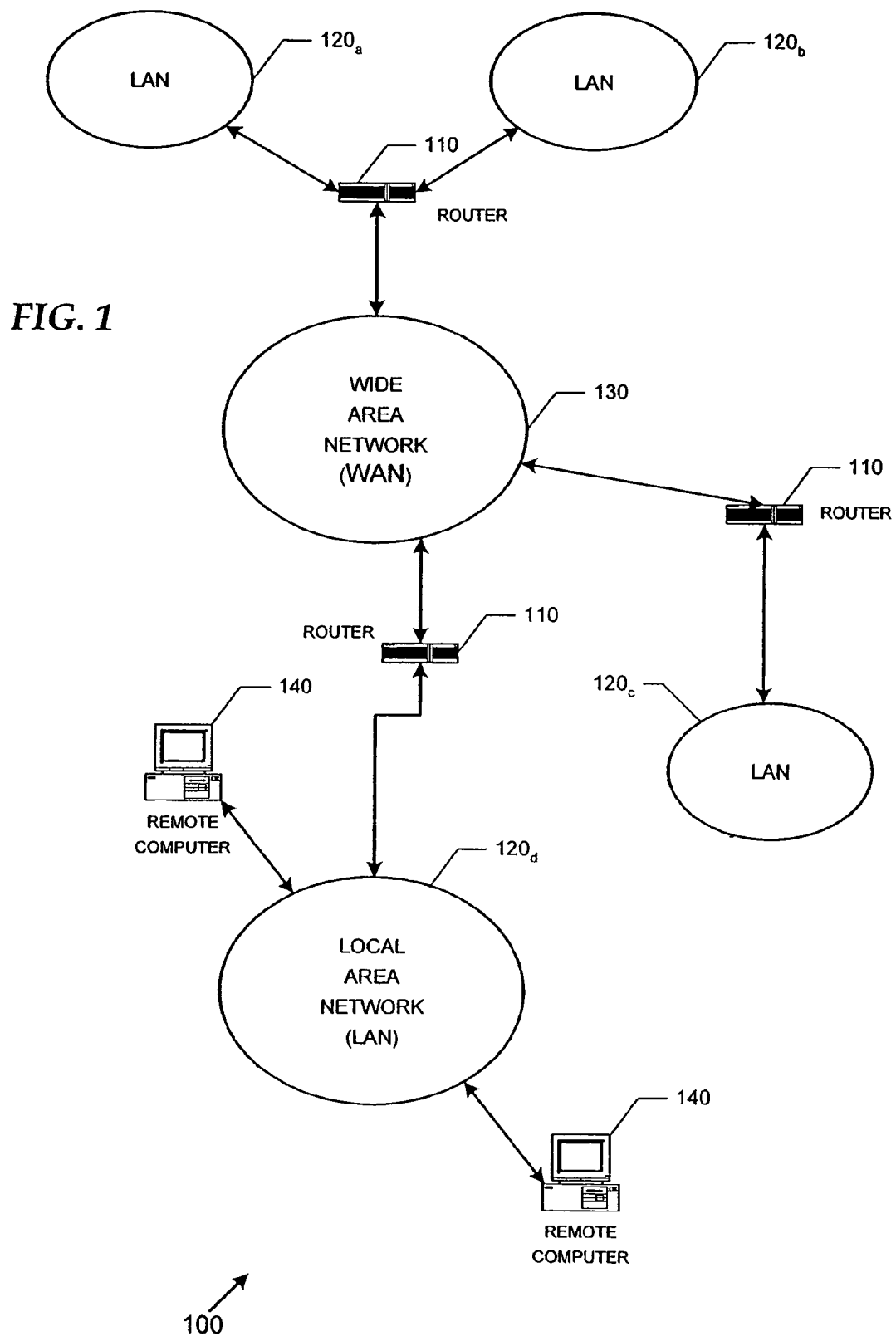
FIGS. 1-4 show schematic diagrams of an illustrative operating environment for the present invention.

The present invention will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "platform" means at least in part to the type of operating system and browser application that are employed to display a web page.

Throughout the specification, the term "web page" or "webpage" means at least a markup language document that can be accessed at a uniform resource locator (URL), web address, and the like over a network. The mark up language can include, but is not limited to, HTML, XML, DHTML, VHTML, and the like. A web page can be displayed with different applications, including, but not limited to, a browser, editor, viewer, and the like.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the invention is directed to a system and method for automatically enabling the font size for text in a web page to be maintained as intended by the author across different types of platforms and without disabling the native browser control for adjusting font sizes. If a web page that employs the invention is selected for display, the type of platform, i.e., particular operating system and browser application, for displaying the web page is automatically determined. In different embodiments, this determination can be performed with a script, applet, program, application, and the like. Once the platform is determined, the invention automatically provides the platform with predetermined small, big, and default font sizes that enable the display of the text at substantially the same size(s) as intended by the author of the web page.

Out of band research is performed to determine a hierarchical ranking of the most to least used platforms to display a web page that employs the invention. At least in part based on this ranking, the invention can quickly determine if one of the more popular platforms is employed to display a web page that uses the invention. Also, out of band, research is performed for the different platforms to predetermine font sizes for small, big and default text that will enable the display of text as intended by the author of the web page at a substantially similar size on each platform. Once the type of platform is determined, the predetermined font sizes for that particular type of platform are provided for displaying text in a web page that employs the invention.

Also, since predetermined font sizes are provided to each platform for displaying text in the web page, the functionality of any font size controls native to that particular platform's browser will remain substantially operative. Additionally, a default font, colors, and the like, can be provided to the particular platform used to display a web page the employs the invention.

In one embodiment, the relative small, default, and big, font sizes are provided as HTML tags, which enables their sematic meaning to be preserved.

Illustrative Operating Environment

FIGS. 1-4 show components of an exemplary environment in which the invention maybe practiced. Not all the components are required to practice the invention, and variations in the arrangement and type of the components may be made without departing from the spirit or scope of the invention.

FIG. 1 shows a plurality of local area networks ("LANs") 120$_{a-d}$ and wide area network ("WAN') 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120$_{a-d}$ or WAN 130 via a modem and temporary telephone link.

As such, it will be appreciated that the Internet itself may be formed from a vast number of such interconnected networks, computers, and routers. Generally, the term "Internet" refers to the worldwide collection of networks, gateways, routers, and computers that use Transmission Control Protocol/Internet Protocol ("TCP/IP") and other packet based protocols to communicate with one another. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
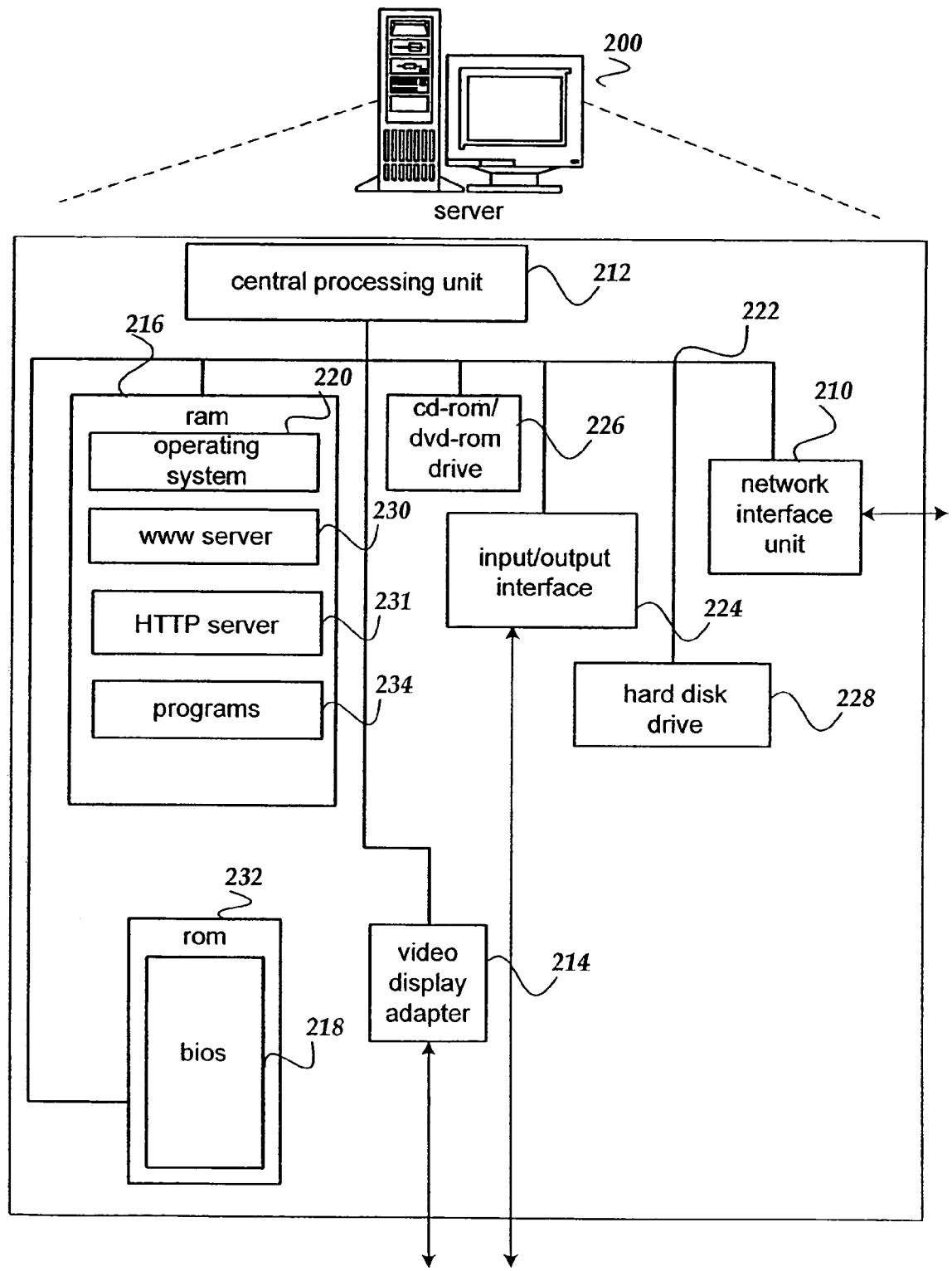

FIG. 2 shows an exemplary server that may operate to provide a World Wide Web site (web site), an email system, and a sponsored search application among other things. When providing a web site, server 200 transmits pages to a browser application executing on the requesting devices to carry out this process. For example, server 200 may communicate pages and forms for setting up an email account for the user. Moreover, server 200 may transmit pages to a requesting device that allow the user to participate in a web site, such as send email to another user. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer-readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a web site. More specifically, the mass memory may store applications including WWW server application 230, HTTP server 231, and programs 234. WWW server application 230 includes computer executable instructions which, when executed by server 200, generate browser displays, including performing the logic described above. Server 200 may include a JAVA virtual machine, an SMTP handler application for transmitting and receiving email, an HTTP handler application for receiving and handing HTTP requests, and an HTTPS handler application for handling secure connections. The HTTPS handler application may also be used for communication with an external security application to send and receive sensitive information, such as email, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by sponsored search server 231 and WWW server 230.

Figure 3:
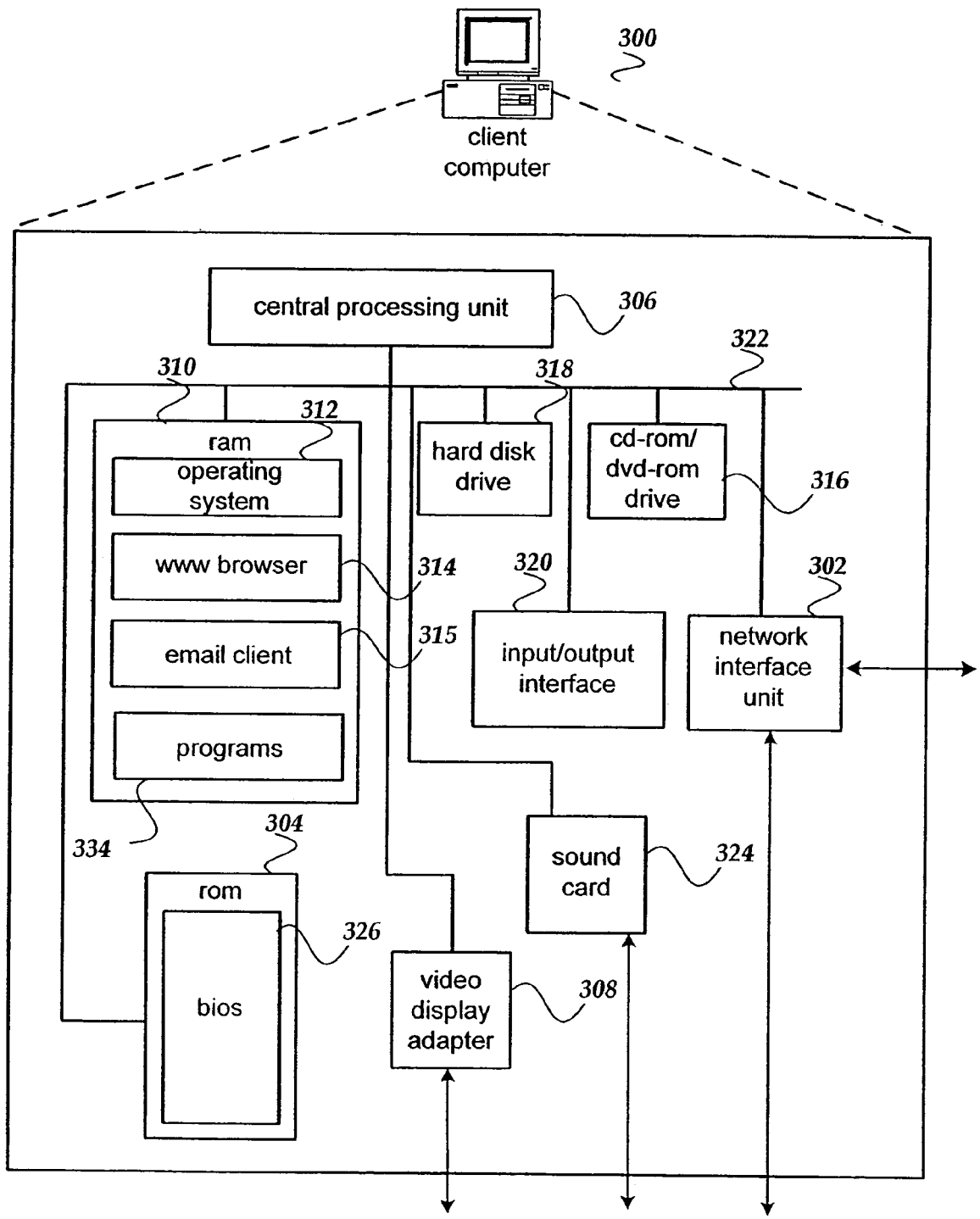

FIG. 3 depicts several components of client computer 300. Those of ordinary skill in the art will appreciate that client computer 300 may include many more components than those shown in FIG. 3. However, it is not necessary that those generally conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point to point protocol ("PPP") connection or a serial line internet protocol ("SLIP") connection as known to those skilled in the art.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory also includes email client 315 for accessing email over a network, and browser application 314 for accessing web sites and sponsored search servers. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

Figure 4:
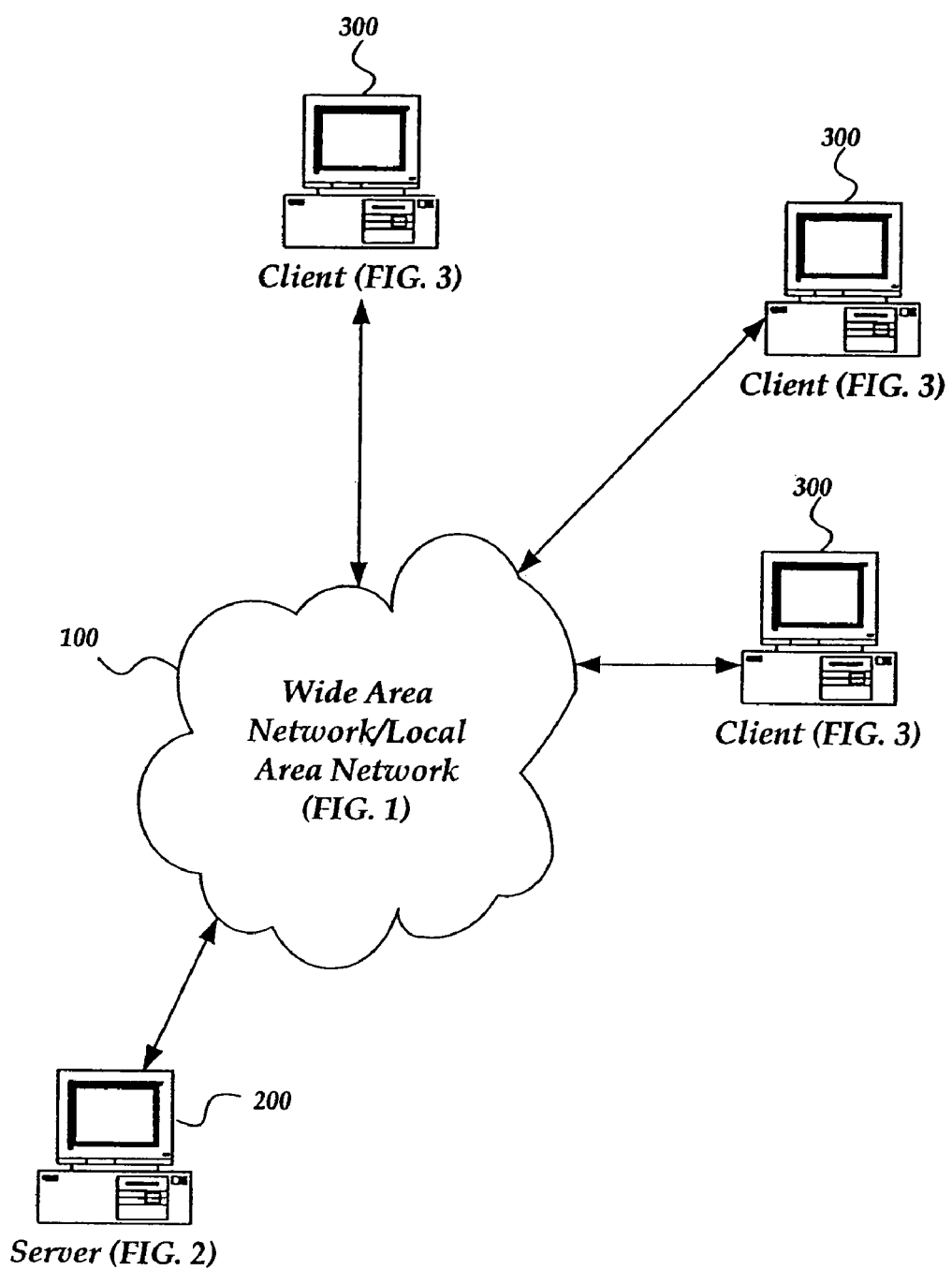

FIG. 4 illustrates an overview of an exemplary environment in which the invention operates in which multiple clients 300 can be in communication with at least one server 200 that provides sponsored search services over network 100. Although FIG. 4 refers to client computer 300 as an exemplary client device, other types of client devices may be employed with the invention, such as, for example, multiprocessor systems, microprocessor-based or programmable consumer electronics, network PCs, PDAs, wearable computers, and the like. These client devices may also include devices that typically connect to network 100 using a wireless communications medium, e.g., mobile telephones, smart phones, pagers, walkie talkies, radio frequency (RF) devices, infrared (IR) devices, integrated devices combining one or more of the preceding devices, and the like.

Methods of Operation

Figure 5:
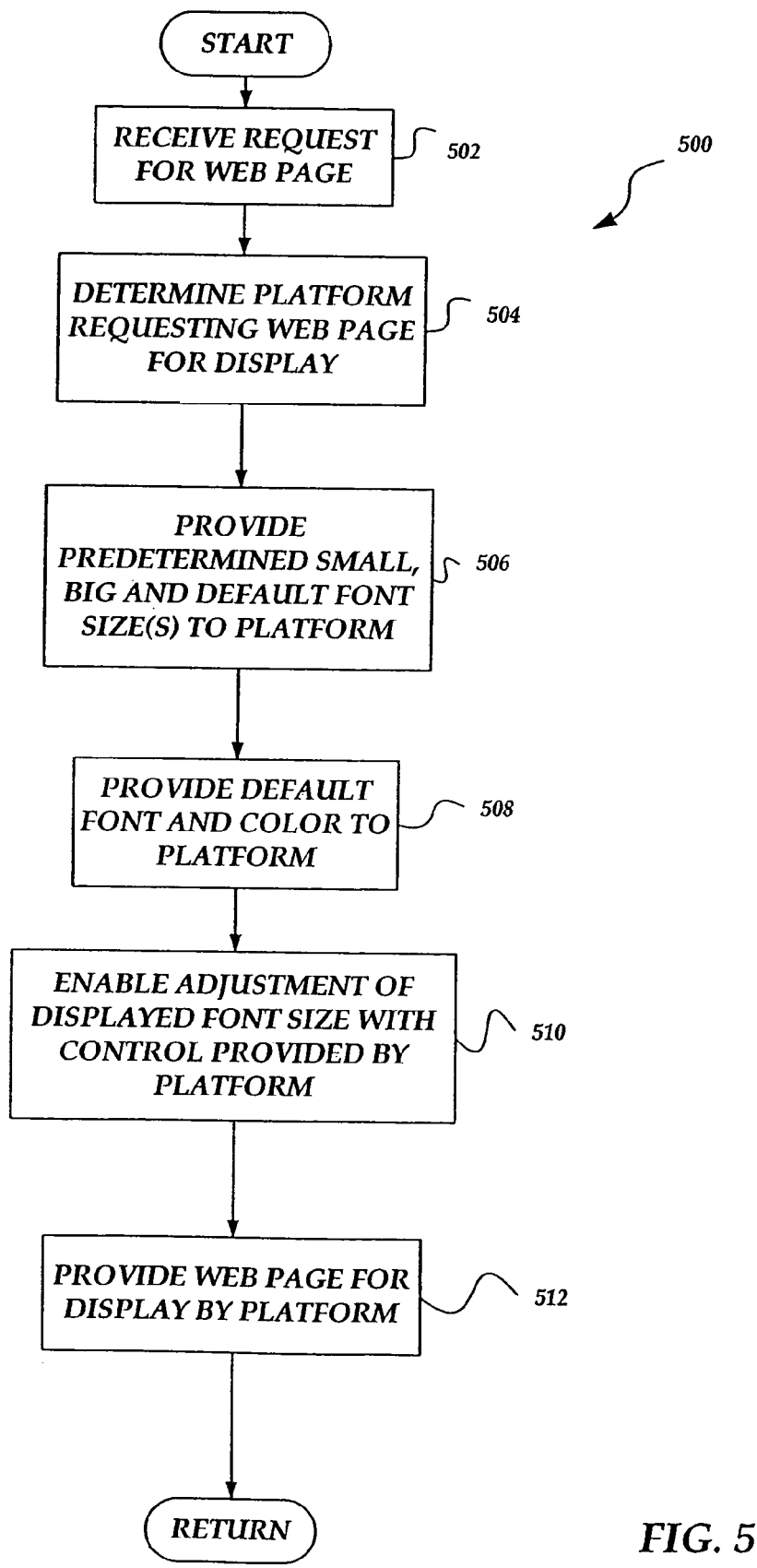
FIG. 5 illustrates an exemplary flow diagram for providing predetermined font sizes for displaying text in a requested web page.

FIG. 5 illustrates an exemplary flow chart for providing particular font sizes that enable the display of text in a web page at substantially the intended size(s) on different types of platforms. Moving from a start block, the process moves to block 502 where a request is received for a web page. At block 504, the process determines the particular type of platform (operating system and browser combination) that is requesting the web page. Briefly, the process can determine each type of platform in an order based on factors determined out of band such as frequency of use with the invention. At block 506, the process provides predetermined small, big and default (often medium) font sizes to the determined platform that will be displaying the web page.

Next, the process flows to block 508 where a default font and at least one color such as for the background are provided to the platform for displaying the web page. At block 510, a control that is native to the determined platform is enabled for adjusting the font sizes displayed by the web page. Moving to block 512, the process provides the contents of the web page to the determined platform for subsequent display. The process advances to a return block and returns to processing other actions.

Figure 6:
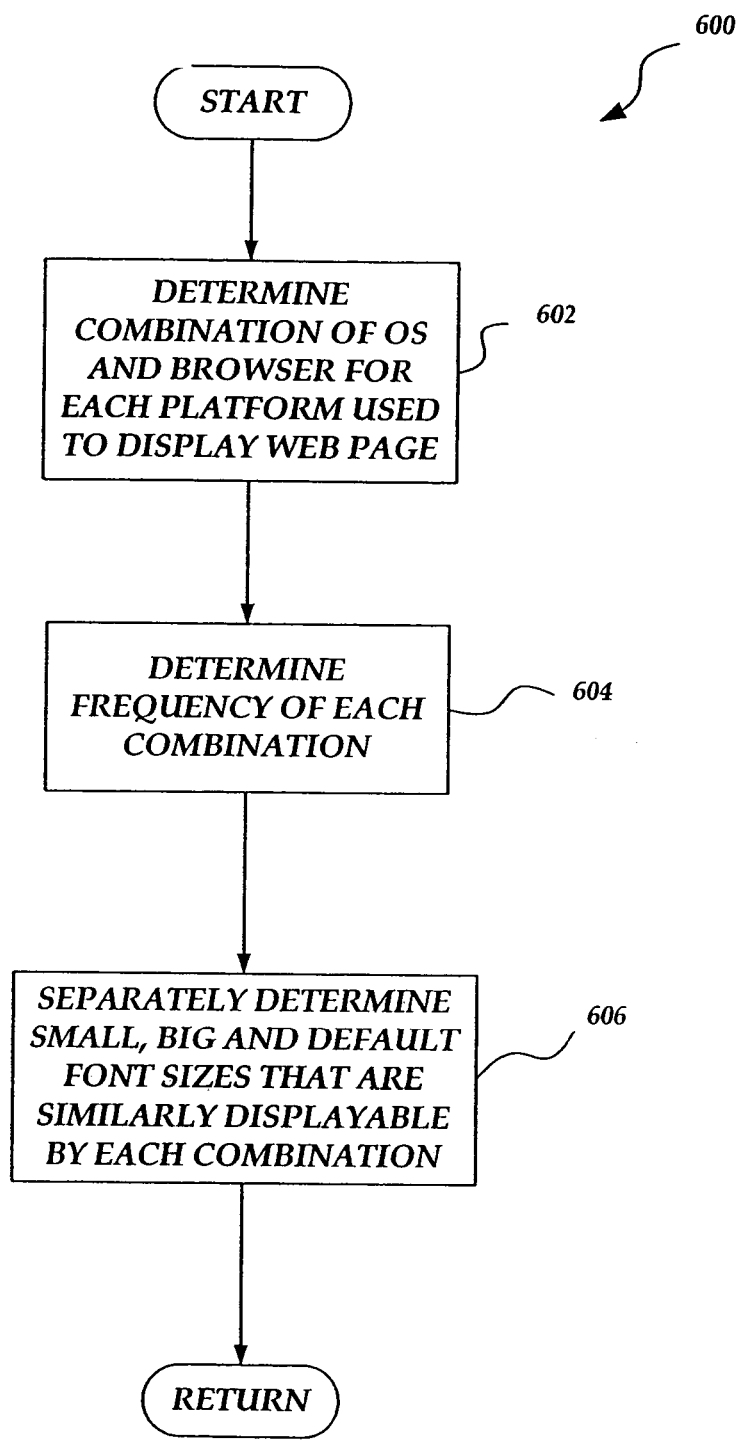
FIG. 6 shows an exemplary flow diagram for determining sizes of a font to be provided to each type of platform.

FIG. 6 illustrates an exemplary overview flow chart 600 for predetermining out of band the font sizes and the frequency at which each platform is employed to display web pages. Moving from a start block, the process steps to block 602 where combinations of different kinds of browsers and operating systems for displaying web pages are determined. As discussed above, each type of platform is based on the kind of browser and operating system employed to display the web page. At block 604, the frequency of use for each platform is determined. This "frequency" is determined out of band, i.e., it is not determined by the invention at "run time". Flowing to block 606, the process separately determines small, big and default font sizes for each platform. By separately determining font sizes for each platform, the invention enables the subsequent display of text in a web page to have substantially the same relative sizes on each type of platform. Next, the process moves to a return block and returns to processing other actions.

Figure 7:
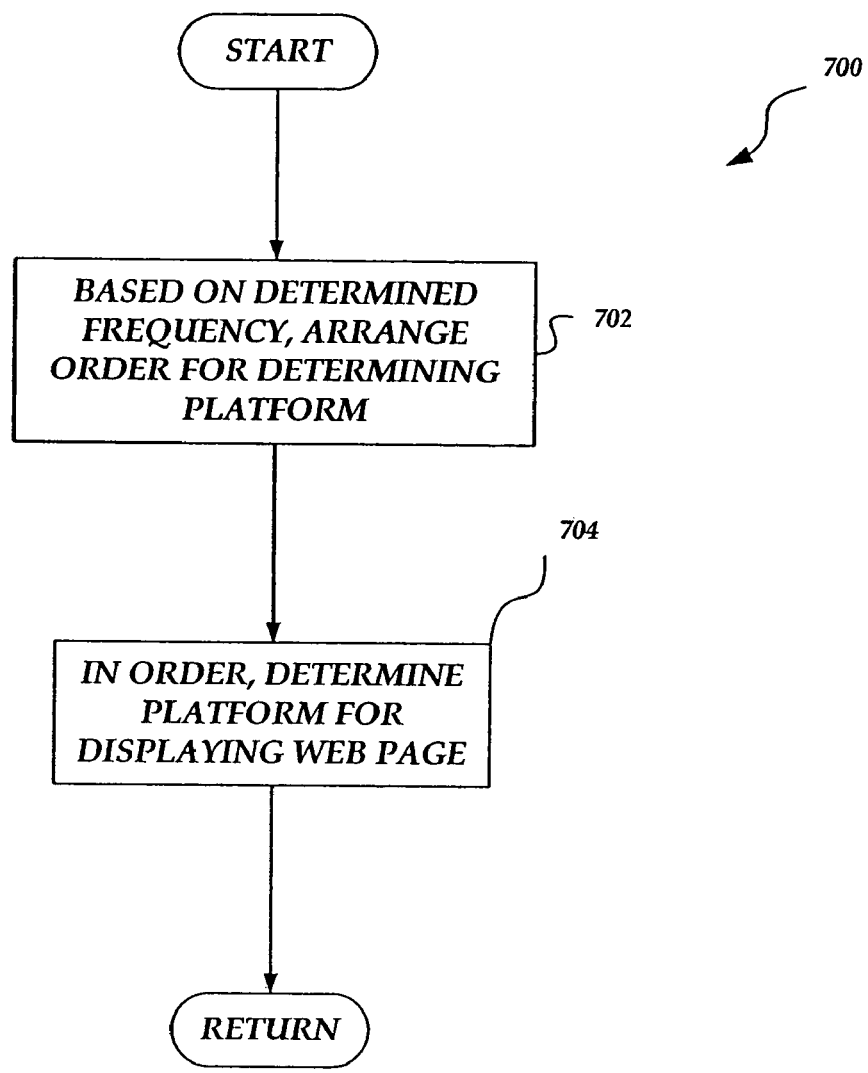
FIG. 7 illustrates an exemplary flow diagram for ordering the determination of the type of a platform.

FIG. 7 illustrates an exemplary overview flow chart 700 where the frequency of different types of platforms is determined in substantially the same manner as discussed above in regard to block 504 in FIG. 5. Moving from a start block, the process steps to block 702 where, based on the determined frequency of each type of platform, the order for determining the type of platform is arranged from most used to least used. At block 704, the type of platform is determined in the arranged order for displaying a web page. By determining the type of platform in order, the speed and efficiency of the process can be improved.

Figure 8:
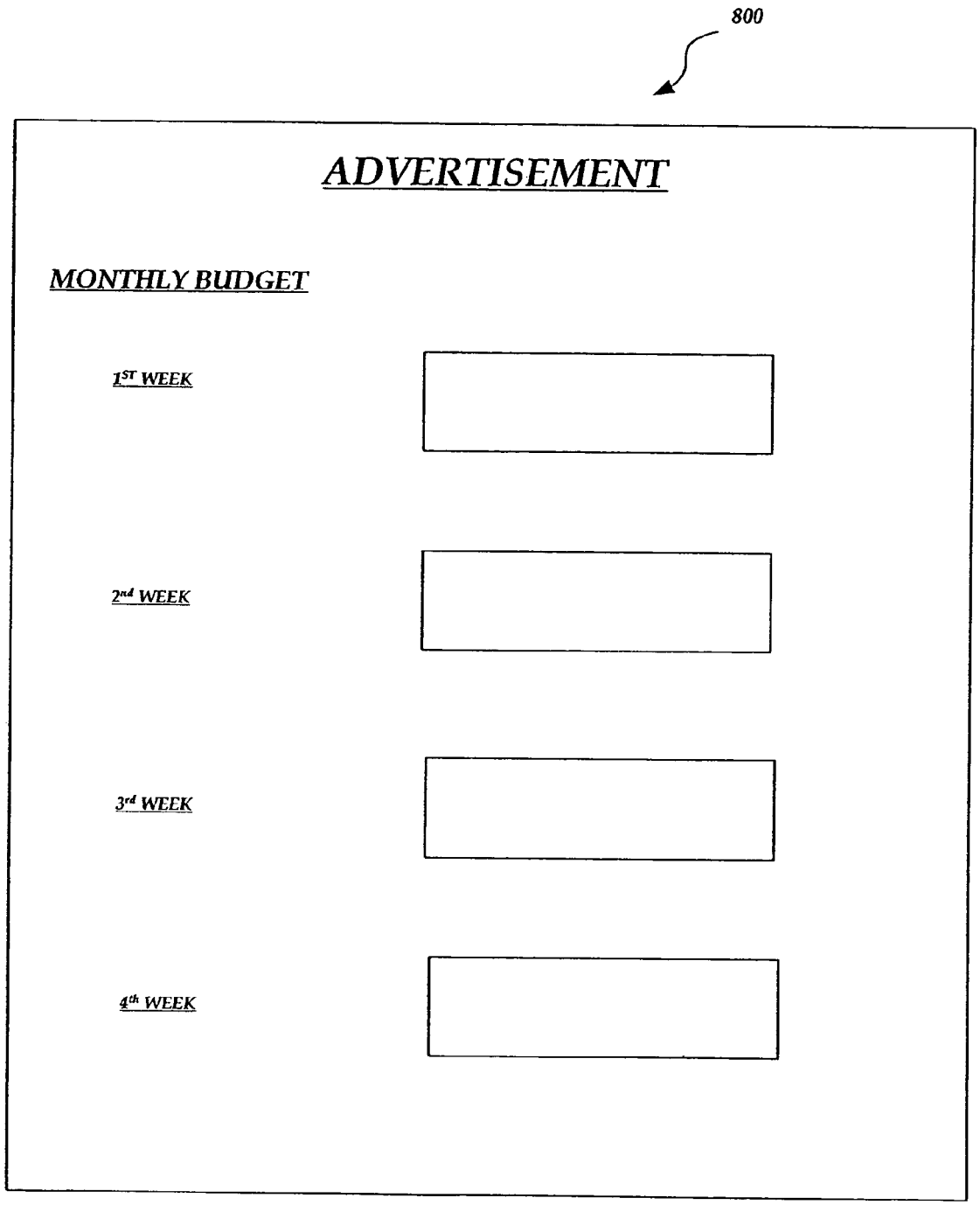
FIG. 8 illustrates an exemplary display of text in a web page that has small, big and default font sizes.

FIG. 8 shows an exemplary display of a web page with text that illustrates a large font size ("Advertisement"), default font size ("Monthly Budget"), and small font size ($1^{st}$ week, et. al.). Although not shown, if a browser control was used to increase the size of the fonts displayed by the browser, the relative size ratio between the small, big and default font sizes would be maintained.

Figure 9:
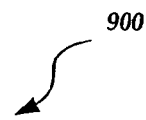
FIG. 9 shows an exemplary script that calls another JavaScript for implementing the invention.

FIG. 9 illustrates an exemplary script tag that can be included with a web page for calling a script ("JavaScript") that actually implements the invention. By using this exemplary script tag, one instance of the invention can be referenced from many places/web pages.

FIG. 10 shows an exemplary JavaScript for determining the type of platform for displaying a web page and then providing small, big, and default font sizes for the displayed text. The JAVA script also provides a default font and colors for certain attributes of the displayed web page. As shown, five types of platforms are determined in a most to least used order, with the final "bucket" being the "default/catch-all". The determination of platform types is arranged in the following order: (1) a NETSCAPE browser and the WINDOWS operating system; (2) a NETSCAPE browser and the MACINTOSH operating system; (3) a NETSCAPE browser and the UNIX operating system; (4) a NETSCAPE version 6 browser or INTERNET EXPLORER browser and the MACINTOSH operating system; and (5) any other combination of a browser and an operating system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing a document that is remotely displayed, comprising:
    receiving a request for a document from a remote platform, a type of remote platform including a type of an operating system and a type of a native browser that are employed to display the document;
    determining the type of the remote platform and selectively associating a size ratio between a plurality of font sizes with the determined type of the remote platform, said determining the type of the remote platform comprising determining the type of the operating system and determining the type of the native browser, and the selective association being based on the determined type of the operating system and the determined type of the native browser;
    providing the document with the size ratio for the plurality of font sizes to the remote platform for display, the provided document being locally scaled for display by the operation of the native browser with the size ratio for the plurality of font sizes, and the provided document comprising at least one markup language text element; and
    enabling the plurality of font sizes to be changed with at least one control of the native browser operating on the remote platform, a size change to the font sizes being determined by the operation of the native browser, the size ratio between the plurality of font sizes being maintained for a change to a size of at least one font displayed in the document at the remote platform, the at least one control changes the at least one font for at least one style element associated with at least one markup language text element displayed within the document.

2. The method of claim 1, further comprising:
    pre-determining the size ratio and the plurality of font sizes for each type of a plurality of remote platforms; and
    selecting the predetermined size ratio and the plurality of font sizes for association with the determined type of remote platform.

3. The method of claim 1, further comprising determining a font color for the plurality of fonts, wherein the font color is provided with the document to the remote platform.

4. The method of claim 1, further comprising determining a background color for the document, wherein the background color is provided to the remote platform.

5. The method of claim 1, wherein the determination of the type of the remote platform further comprises determining a version of the operating system for the remote platform.

6. The method of claim 1, wherein the determination of the type of the remote platform further comprises determining a version of the native browser for the remote platform.

7. The method of claim 1, wherein the document is provided in a mark-up language.

8. The method of claim 1, wherein the determining the type of the remote platform further comprises an ordered comparison of the remote platform to a plurality of pre-determined types of remote platforms, wherein the ordering is based on at least a frequency of use.

9. The method of claim 1, further comprising providing at least one font for displaying with the document.

10. The method of claim 1, further comprising providing at least one size for each of a small font, a default font and a big font for displaying with the document.

11. A server for enabling a document to be remotely displayed, comprising:
    a memory for storing data and a plurality of instructions;
    a processor for enabling actions, including:
    receiving a request for a document from a remote platform, a type of remote platform including a type of an operating system and a type of a native browser that are employed to display the document, the received document being a markup language document;
    determining the type of the remote platform and selectively associating a size ratio between a plurality of font sizes with the determined type of the remote platform, said determining the type of the remote platform comprising determining the type of the operating system and determining the type of the native browser, and the selective association being based on the determined type of the operating system and the determined type of the native browser;
    providing the document and the size ratio between the plurality of font sizes to the remote platform for display, the provided document being locally scaled for display by the operation of the native browser with the size ratio for the plurality of font sizes; and
    enabling the plurality of font sizes to be changed with at least one control of the native browser operating on the remote platform, a size change to the font sizes being determined by the operation of the native browser, the size ratio between the plurality of font sizes being maintained for a change to a size of at least one font displayed in the document at the remote platform.

12. The server of claim 11, wherein the actions further comprise:
    pre-determining the size ratio and the plurality of font sizes for each type of a plurality of remote platforms; and
    selecting the predetermined size ratio and the plurality of font sizes for association with the determined type of remote platform.

13. The server of claim 11, wherein the actions further comprise determining a font color for the plurality of fonts, wherein the font color is provided with the document to the remote platform.

14. The server of claim 11, wherein the actions further comprise determining a background color for the document, wherein the background color is provided to the remote platform.

15. The server of claim 11, wherein the actions further comprise determining a version of the operating system for the remote platform.

16. The server of claim 11, wherein the actions further comprise determining a version of the native browser for the remote platform.

17. The server of claim 11, wherein the actions further comprise an ordered comparison of the remote platform to a plurality of pre-determined types of remote platforms, wherein the ordering is based on at least a frequency of use.

18. The server of claim 11, further comprising providing at least one font for displaying with the document.

19. The server of claim 11, further comprising providing at least one size for each of a small font, a default font and a big font for displaying with the document.

20. A client for enabling a document to be remotely displayed, comprising:
    a memory for storing instructions;
    a processor for enabling actions, including:
    providing a request for a document to a server;
    enabling the server to determine a type of a platform for the client and selectively associating a size ratio between a plurality of font sizes with the determined type of the remote platform by the server, the type of the platform including a type of an operating system and type of a native browser that are employed to display the document, the enabling the server to determine the type of the remote platform comprising enabling the server to determine the type of the operating system and to determine the type of the native browser, and the selective association based on the determined type of the operating system and the determined type of the native browser;

receiving the document for display, the received document being locally scaled for display by the operation of the native browser with the size ratio for the plurality of font sizes; and enabling the plurality of font sizes to be changed with at least one control of the native browser operating on the client, a size change to the font sizes being determined by the operation of the native browser, the size ratio between the plurality of font sizes being maintained for a change to a size of at least one font displayed in the document at the remote platform, the at least one control changes the at least one font associated with at least one markup language text element displayed within the document.

21. The client of claim 20, wherein the actions further comprise:
enabling a pre-determination of the size ratio and the plurality of font sizes for each type of a plurality of platforms; and
enabling a selection of the predetermined size ratio and the plurality of font sizes for association with the determined type of the platform.

22. The client of claim 20, wherein the actions further comprise enabling a determination of a font color for the plurality of fonts, wherein the font color is provided with the document to the platform.

23. The client of claim 20, wherein the actions further comprise enabling a determination of a background color for the document, wherein the background color is provided to the platform.

24. The client of claim 20, wherein the actions further comprise enabling a determination of a version of the operating system for the platform.

25. The client of claim 20, wherein the actions further comprise enabling a determination of a version of the native browser for the platform.

26. The client of claim 20, wherein the document is provided in a mark-up language.

27. The client of claim 20, wherein the actions further comprise enabling an ordered comparison of the platform to a plurality of pre-determined types of platforms, wherein the ordering is based on at least a frequency of use.

28. The client of claim 20, further comprising enabling at least one font to be displayed with the document.

29. The client of claim 20, further comprising enabling at least one size to be provided for each of a small font, a default font and a big font for displaying with the document.

30. A computer-readable storage medium that includes data and instructions for enabling actions to be performed on a remote platform, comprising:
a first component for enabling a request for a document from the remote platform, a type of the platform including a type of an operating system and type of a native browser that are employed to display the document;
a second component for enabling a determination of the type of the remote platform and selectively associating a size ratio between a plurality of font sizes with the determined type of the remote platform, the enabling the determination of the type of the remote platform comprising enabling a determination of the type of the operating system and the determination of the type of the native browser, and the selective association being based on the determination of the type of the operating system and the determination of the type of the native browser;
a third component for enabling the document with a plurality of font sizes for the document to be provided to the remote platform for display, the document is being locally scaled for display by the operation of the native browser with the size ratio for the plurality of font sizes; and
a fourth component for enabling the plurality of font sizes to be changed by an execution of a script included with the document using at least one control of the native browser operating on the remote platform, the size ratio between the plurality of font sizes being determined by the native browser and maintained for a change to a size of at least one font displayed in the document at the remote platform, the execution changes the at least one font for at least one markup language text element displayed within the document.

31. The computer-readable storage medium of claim 30, further comprising:
a component for enabling a pre-determination of the size ratio and the plurality of font sizes for each type of a plurality of remote platforms; and
another component for enabling a selection of the predetermined size ratio and the plurality of font sizes for association with the determined type of remote platform.

32. The computer-readable storage medium of claim 30, further comprising a component for enabling a determination of a font color for the plurality of fonts, wherein the font color is provided with the document to the remote platform.

33. The computer-readable storage medium of claim 30, further comprising a component for enabling a determination of a background color for the document, wherein the background color is provided to the remote platform.

34. The computer-readable storage medium of claim 30, further comprising a component for enabling a determination of a version of the operating system for the remote platform.

35. The computer-readable storage medium of claim 30, further comprising a component for enabling a determination of a version of the native browser for the remote platform.

36. The computer-readable storage medium of claim 30, wherein the document is provided in a mark-up language.

37. The computer-readable storage medium of claim 30, further comprising a component for enabling an ordered comparison of the remote platform to a plurality of pre-determined types of remote platforms, wherein the ordering is based on at least a frequency of use.

38. The computer-readable storage medium of claim 30, further comprising a component for enabling at least one font to be provided for display with the document.

39. The computer-readable storage medium of claim 30, further comprising a component for enabling at least one size for each of a small font, a default font and a big font to be provided for displaying with the document.

40. A method for providing a document that is remotely displayed, comprising:
receiving a request for a document from a remote platform;
providing the document to the remote platform for display, the document being a markup language document that includes at least one instruction to be executed by a control of a native browser operating on the remote platform to determine a size ratio between a plurality of font sizes, the plurality of font sizes being determined prior to the provision of the document to the remote platform, and the provided document being locally scaled for display by the operation of the native browser with the determined size ratio;

determining a type of a native browser of the remote platform;

determining a type of operating system of the remote platform;

selectively determining, by the control of the native browser operating on the remote platform, the size ratio based on an execution of the at least one instruction and based on the determined type of the operating system and the determined type of the native browser, the operating system and native browser being associated with the remote platform; and enabling the plurality of font sizes to be changed by the control of the native browser based on the at least one instruction, a size change to the font sizes being determined by the operation of the control of the native browser.

\* \* \* \* \*